(12) United States Patent
Ogawa et al.

(10) Patent No.: US 6,881,465 B2
(45) Date of Patent: Apr. 19, 2005

(54) OPTICAL DISK AND METHOD OF MANUFACTURING THEREOF

(75) Inventors: Mitsuaki Ogawa, Gifu (JP); Yoshiaki Maeno, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 56 days.

(21) Appl. No.: 10/212,066

(22) Filed: Aug. 6, 2002

(65) Prior Publication Data

US 2003/0026937 A1 Feb. 6, 2003

(30) Foreign Application Priority Data

Aug. 6, 2001 (JP) ........................................ 2001-237395

(51) Int. Cl.⁷ .............................................. B32B 3/02
(52) U.S. Cl. .................... 428/64.1; 428/64.4; 428/702; 428/913; 430/270.12; 430/495.1; 430/945
(58) Field of Search .............................. 428/64.1, 64.4, 428/702, 913; 430/270.12, 495.1, 945

(56) References Cited

U.S. PATENT DOCUMENTS

| | | | | |
|---|---|---|---|---|
| 5,965,228 A | * | 10/1999 | Kugler | ........................ 428/64.1 |
| 6,030,678 A | * | 2/2000 | Aratani | ........................ 428/64.1 |
| 6,160,787 A | | 12/2000 | Marquardt, Jr. et al. | |
| 6,205,112 B1 | * | 3/2001 | Weidner | ................... 369/275.3 |
| 6,320,840 B1 | * | 11/2001 | Oh et al. | ...................... 369/286 |
| 6,434,107 B1 | * | 8/2002 | Artigalas et al. | ......... 369/275.1 |
| 6,537,637 B1 | * | 3/2003 | Kaneko et al. | ............. 428/64.1 |
| 2002/0142099 A1 | * | 10/2002 | Dubs | ........................... 427/402 |
| 2003/0123378 A1 | * | 7/2003 | Lin et al. | .................. 369/275.3 |

FOREIGN PATENT DOCUMENTS

| | | |
|---|---|---|
| JP | 8-339574 | 12/1996 |
| JP | 11-16209 | 1/1999 |
| JP | 11-126370 | 5/1999 |
| JP | 2000-331381 | 11/2000 |

* cited by examiner

Primary Examiner—Elizabeth Mulvaney
(74) Attorney, Agent, or Firm—Arent Fox PLLC

(57) ABSTRACT

An optical disk includes a first substrate provided with a first minute concaves/convexes forming a CD signal and a second substrate provided with a second minute concaves/convexes forming a DVD signal, and a wavelength selective multi-layered film is formed on the second minute concaves/convexes by laminating titanium dioxide films and silicon dioxide films approximately fifteen (15) layers. Due to the wavelength selective multi-layered film, a laser beam which reproduces the CD signal is transmitted by a transmissivity of more than 80%, and a laser beam which reproduces the DVD signal is reflected by a reflectivity of more than 80%.

8 Claims, 4 Drawing Sheets

| | KIND | CD | DVD |
|---|---|---|---|
| RATED VALUE | SUBSTRATE THICKNESS AT SIDE OF READING SURFACE | 1.2mm (1.1~1.3mm) | 0.6mm (0.55~0.65mm) |
| | SHORTEST PIT LENGTH | 0.83 μm (0.80~0.90 μm) | 0.40 μm (0.3~0.5 μm) |
| | TRACK PITCH | 1.6 μm (1.5~1.7 μm) | 0.74 μm (0.73~0.75 μm) |
| | REFLECTIVITY | 70%以上 | 20~40% |
| REPRODUCING CONDITION | SPOT SIZE | 1.5 μm (1.4~1.6 μm) | 0.9 μm (0.85~0.95 μm) |
| | NUMERICAL APERTURE (NA) | 0.45 (0.44~0.46 μm) | 0.60 (0.55~0.65) |
| | WAVELENGTH | 635nm/650nm | |

OPTICAL DISK AND METHOD OF MANUFACTURING THEREOF

BACKGROUND OF THE INVENTION

1. Field of the Invention

The present invention relates to an optical disk. More specifically, the present invention relates to an optical disk in which a second recording layer which reflects a second wavelength laser beam is laminated onto an opposite side of a first recording layer which reflects a first wavelength laser beam, and a method of manufacturing thereof.

2. Description of the Prior Art

There is a hybrid optical disk capable of reproducing signals having a plurality of standards such as a CD (Compact Disk), a DVD (Digital Versatile Disk), and etc. from a single optical disk. Examples of such the optical disk are disclosed in Japanese Patent Laying-open No. 11-16209 [G11B 7/24] laid-open on Jan. 22, 1999 and in Japanese Patent Laying-open No. 2000-331381 [G11B 7/24] laid-open on Nov. 30, 2000.

These optical disks have structure that a first substrate which records a first signal such as a CD signal, for example and a second substrate which records a second signal such as a DVD signal, for example are pasted or laminated to each other. Then, provided that the second substrate be an irradiation side of a laser beam, the first signal recorded on the first substrate is reproduced based on a laser beam that transmits the second substrate and is reflected by pits formed on the first substrate, and the second signal recorded on the second substrate is reproduced based on a laser beam reflected by pits formed on the second substrate. Therefore, a layer between the first substrate and the second substrate (hereinafter referred to as "intermediate layer") needs to transmit the first laser beam for reproducing the first signal and reflect the second laser beam for reproducing the second signal. It is noted that the first laser beam and the second laser beam are different in wavelength.

The intermediate layer needs to transmit the first laser beam for reproducing the first signal, and has an optical transparency so that, in general, a reflectivity of the second laser beam for reproducing the second light at the intermediate layer becomes low. Accordingly, there are problems that it needs to enhance an output of a laser beam to be irradiated and that it needs to amplify a laser beam signal being received.

However, if the output of the laser beam is enhanced, there arises a problem that not only a cost of an optical pickup becomes expensive, but also a durability of the laser is shortened.

SUMMARY OF THE INVENTION

Therefore, a primary object of the present invention is to provide a novel optical disk and a method of manufacturing thereof.

Another object of the present invention is to provide an optical disk capable of transmitting a first laser beam with a high transmissivity and reflecting a second laser beam with a high reflectivity, and a method of manufacturing thereof.

An optical disk according to the present invention, comprises: a first recording layer which reflects a first wavelength laser beam; and a second recording layer which is laminated on an opposite side of the first recording layer and reflects a second wavelength laser beam, wherein the second recording layer is formed by a multi-layered film having a wavelength selectivity to transmit the first wavelength laser beam and reflect the second wavelength laser beam.

In a preferred embodiment, the multi-layered film is a film in which $TiO_2$ layers and $SiO_2$ layers are alternately laminated. The multi-layered film transmits the first wavelength laser beam for more than 80%, and reflects the second wavelength laser beam for more than 80%. In addition, the first wavelength laser beam is a laser beam which meets a CD standard, and the second wavelength laser beam is a laser beam which meets a DVD standard.

A manufacturing method according to the present invention is a method of manufacturing of an optical disk in which a second recording layer which reflects a second wavelength laser beam is laminated onto an opposite side of a first recording layer which reflects a first wavelength laser beam, including following steps of: (a) forming a substrate having a minute concaves/convexes on one surface; (b) forming on the one surface the second recording layer formed of a wavelength selective multi-layered film; and (c) laminating a disk member formed with the first recording layer onto a surface of the second recording layer.

In this method of manufacturing, $TiO_2$ layers and $SiO_2$ layers are alternately laminated in the step (b).

In the present invention, a multi-layered film having a wavelength selectivity transmits a laser beam, that is, a wavelength for CD signal reproduction more than 80% of transmissivity, and the laser beam transmitted by a high transmissivity is reflected by a reflection film. In addition, a laser beam, that is, a wavelength for DVD signal reproduction is reflected by a reflectivity of more than 80%. Therefore, it is possible to obtain a laser beam of a large amount of light, and thus possible to make outputs of the laser beam for DVD signal reproduction and the laser beam for DVD signal reproduction smaller, and to improve an S/N characteristic of the reproduced signal.

According to the present invention, an output of the laser beam can be kept low, thus possible to hold down an electrical power consumption for reproducing a CD signal and a DVD signal, and also improve a characteristic of the reproduced signal.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
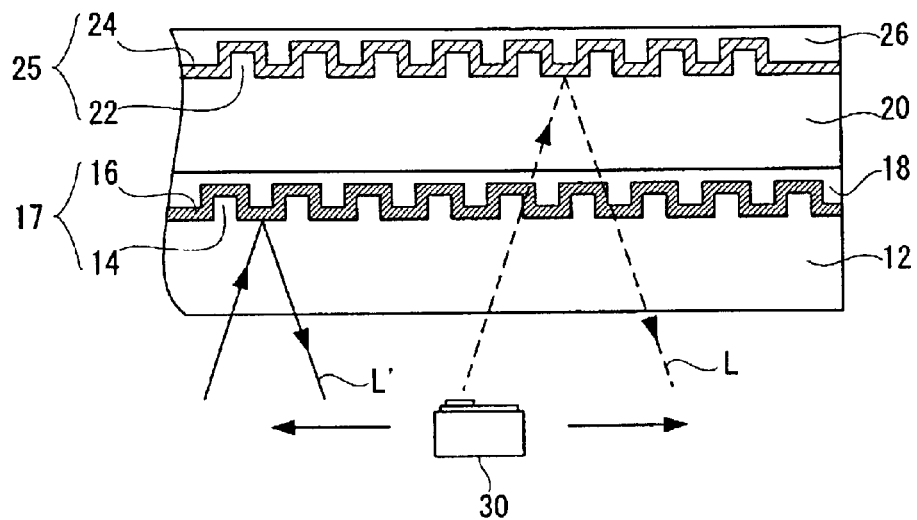
FIG. 1 is an illustrative view showing whole structure of one embodiment of the present invention.

FIG. 1 is an illustrative view showing whole structure of one embodiment of an optical disk 10 according to the present invention. A left side of FIG. 1 is an inner peripheral side of the optical disk 10, and a right side is an outer peripheral side of the optical disk 10. In addition, an optical pickup moves right and left in FIG. 1.

The optical disk 10 in this embodiment includes a first substrate 20 on which a first signal capable of being reproduced by a first wavelength laser beam is recorded as a first minute concaves/convexes (pit) 22, a second substrate 12 on which a second signal capable of being reproduced by a second wavelength laser beam is recorded as a second minute concaves/convexes (pit) 14, a reflection film 24 formed on the first minute concaves/convexes 22, a protection film 26 formed on the reflection film 24, a wavelength selective multi-layered film 16 formed on the second minute concaves/convexes and an adhesive film 18 which is provided between the first substrate 20 and the second substrate 12 and adheres the first substrate 20 and the second substrate 12 to each other. Furthermore, a first recording layer 25 is formed by the first minute concaves/convexes 22 and the reflection film 24 on the first substrate 20, and a second recording layer 17 is formed by the second minute concaves/convexes 14 and the wavelength selective multi-layered film 16 on the second substrate 12. A recording density of the second signal is higher than a recording density of the first signal, that is, the second minute concaves/convexes 14 is minuter than the first minute concaves/convexes 22. Therefore, the optical disk 10 can be a hybrid optical disk 10 on which the first signal is rendered as a CD (Compact Disc) signal and the second signal is rendered as a DVD (Digital Versatile Disc) signal.

Provided that the first signal be the CD signal and the second signal be the DVD signal, laser beams of two kinds of wavelengths, that is, a first wavelength laser beam for reproducing the CD signal and a second wavelength laser beam for reproducing the DVD signal are irradiated onto the optical disk 10. Accordingly, between the first substrate 20 and the second substrate 12, there is provided with the wavelength selective multi-layered film (dichroic film) 16 which transmits the first wavelength laser beam for reproducing the CD signal with a high transmissivity toward the first substrate 20 and reflects the second wavelength laser beam for reproducing the DVD signal with a high reflectivity. It is noted that the first wavelength laser beam for reproducing the CD signal is of a wavelength of 780 nm ± (plus or minus) 10 nm (Red Book standard), and the second wavelength laser beam for reproducing the DVD signal is of a wavelength of 650 nm ± (plus or minus) 5 nm (DVD Book standard).

Figure 2:
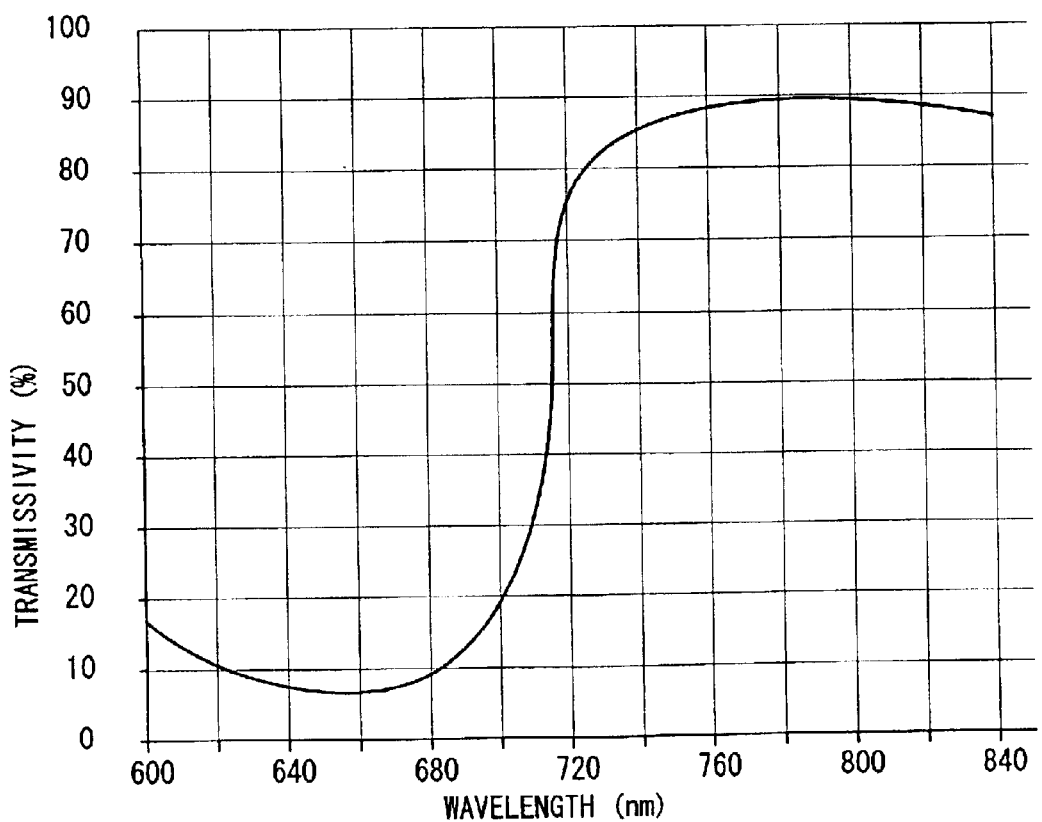
FIG. 2 is an illustrative view showing an optical transmission characteristic of a wavelength selective multi-layered film.

The wavelength selective multi-layered film 16 has an optical transmissivity characteristic as shown in FIG. 2. As understood from this FIG. 2, the wavelength selective multi-layered film 16 transmits a laser beam for reproducing a CD and having a wavelength of 780 nm ± (plus or minus) 10 nm by a transmissivity of more than 80%, and reflects a laser beam for reproducing a DVD and having a reflectivity of 650 nm ± (plus or minus) 5 nm by a reflectivity of more than 80%. Thus, the wavelength selective multi-layered film 16 has a distinctive wavelength selective characteristic (optical filter). A reason why the transmissivity and the reflectivity are both more than 80% will be described later.

Figure 3:
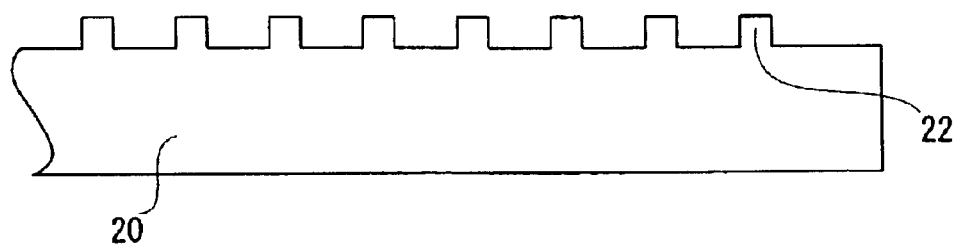
FIG. 3 is an illustrative view schematically showing a first substrate.

Such the optical disk 10 is manufactured as follow. Firstly, the first substrate 20 having on its one surface the first minute concaves/convexes 22, i.e. pits constituting the CD signal is formed by injecting and stamping a light transmissive resin such as polycarbonate or the like at high pressure by using an injection mold with a stamper as shown in FIG. 3.

Figure 4:
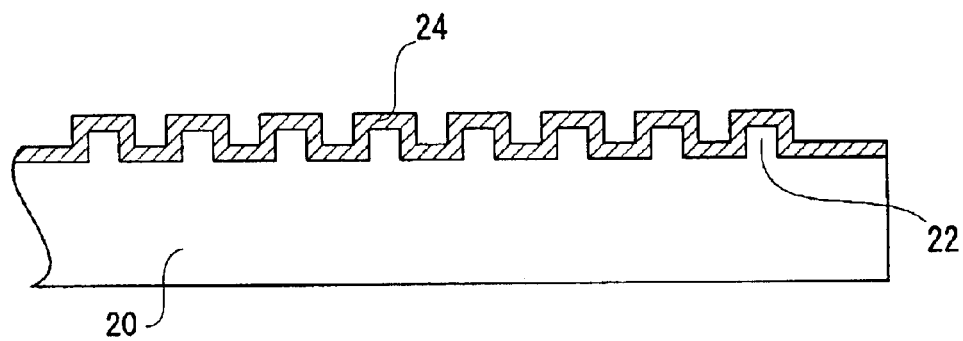
FIG. 4 is an illustrative view schematically showing the first substrate formed with a reflection film is formed.

Upon completion of forming the first substrate 20, next, Al (aluminum) is filmed on the first minute concaves/convexes 22 of the first substrate 20 by a vacuum deposition method or a sputtering method so as to form the reflection film 24 as shown in FIG. 4.

Figure 5:
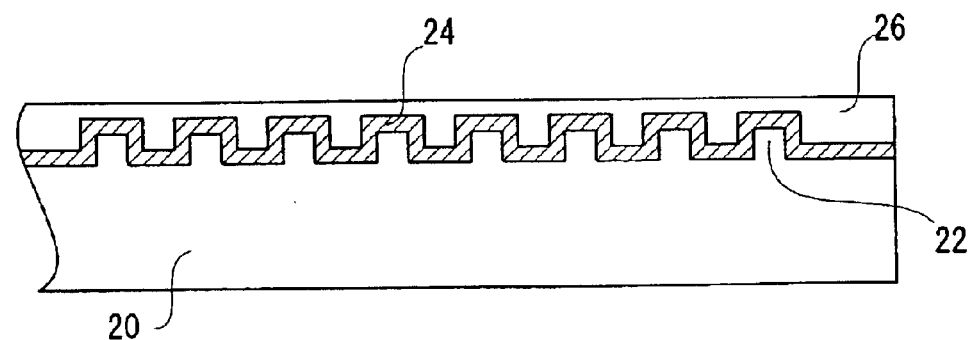
FIG. 5 is an illustrative view schematically showing the first substrate formed with a protection film on the reflection film.

Upon completion of forming the reflection film 24 of aluminum, an UV protection coating process is further applied on the reflection film 24 as shown in FIG. 5 thereby to form the protection film 26 which protects a signal surface of the first minute concaves/convexes 22 and the reflection film 24.

Figure 6:
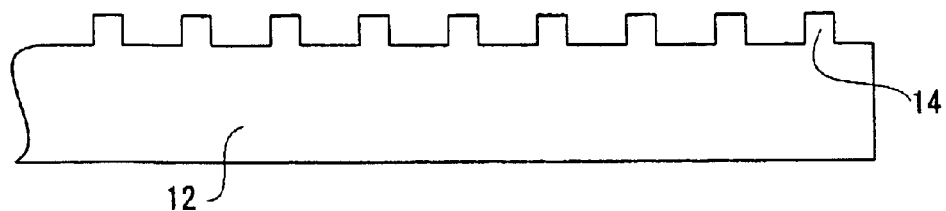
FIG. 6 is an illustrative view schematically showing a second substrate.

Upon completion of forming the first substrate 20 in this manner, next, the second substrate 14 is formed. Firstly, the second substrate 12 having on its surface the second minute concaves/convexes 14, i.e. pits constituting the DVD signal is formed by injecting and stamping a light transmissive resin such as polycarbonate or the like at high pressure by using an injection mold with a stamper as shown in FIG. 6. It is noted that the first substrate 20 and the second substrate 12 may be glass substrates using a 2P (photo polymerization) molding method.

Figure 7:
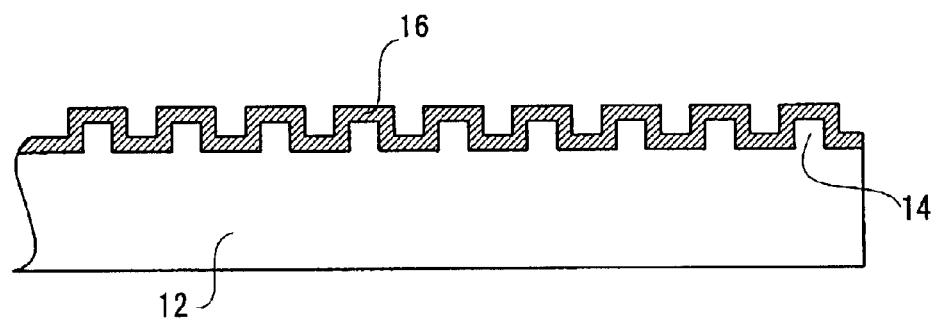
FIG. 7 is an illustrative view schematically showing the second substrate formed with a wavelength selective multi-layered film.
Figure 8:
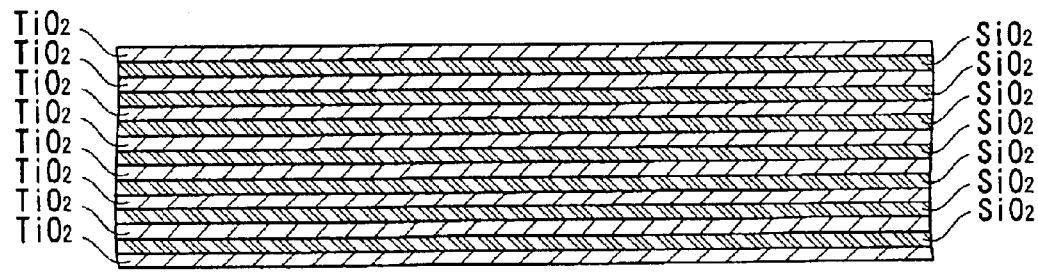
FIG. 8 is an illustrative view showing one example of structure of the wavelength selective multi-layered film.

Upon completion of forming the second substrate 12, next, the wavelength selective multi-layered film 16 is formed on the second minute concaves/convexes 14 of the second substrate 12 as shown in FIG. 7. The wavelength selective multi-layered film 16 is formed to be alternately laminated on the order of 15 layers on a titanium dioxide ($TiO_2$) film and a silicon dioxide film ($SiO_2$) by a vacuum deposition method, a sputtering method, a collimate sputtering method, and etc as shown in FIG. 8. It is noted that the wavelength selective multi-layered film 16 may be formed by laminating a zirconium dioxide ($ZrO_2$) film and a niobium pentoxide ($Nb_2O_5$) film instead of the titanium dioxide ($TiO_2$) film and the silicon dioxide film ($SiO_2$). The wavelength selective multi-layered film 16 thus formed transmits a first wavelength laser beam for reproducing the CD signal and having a wavelength of 780 nm ± (plus or minus) 10 nm by a transmissivity of more than 80%, and reflects a second wavelength laser beam for reproducing the DVD signal and having a reflectivity of 650 nm ± (plus or minus) 5 nm by a reflectivity of more than 80%. A reason why the transmissivity and the reflectivity are both more than 80% is that an S/N characteristic of a reproduced signal deteriorates when the transmissivity and the reflectivity become lower than 80%. Although it is ideal that the transmissivity and the reflectivity are closer to 100%, respectively, it needs to increase the laminated layers of the wavelength selective multi-layered film 16 in order to come closer to 100%. If it attempts to increase the laminating number, it takes more time necessary to form a filming, thus giving rise to a possibility that a damage such as a warping may be caused on the second substrate 12 as a result of an increased time to be irradiated to a high temperature. Therefore, a good balance between the S/N characteristic and the warping of the second substrate 12 becomes important.

Figures 9, 10:
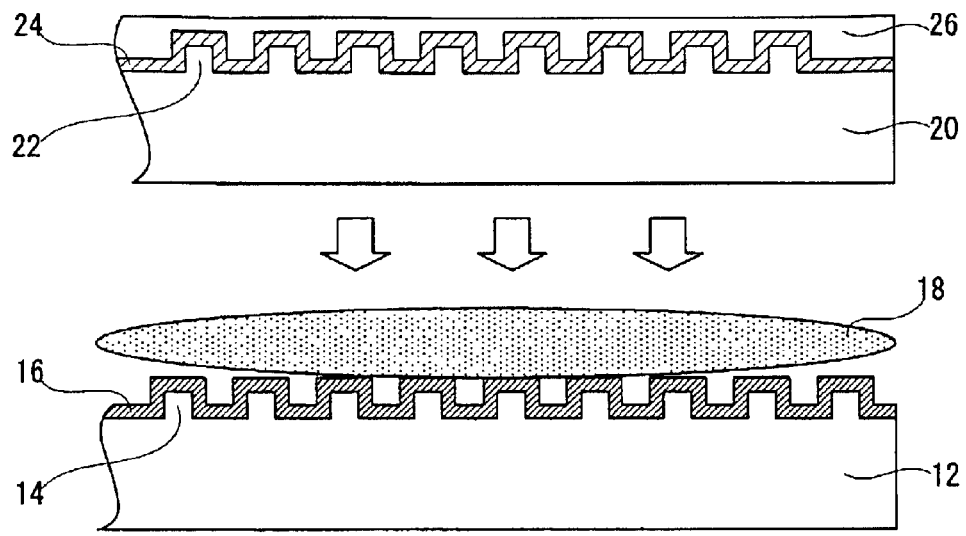
FIG. 9 is an illustrative view showing a state that the first substrate is joined or laminated onto the second substrate having the wavelength selective multi-layered film.
FIG. 10 is an illustrative view showing standards of a CD and a DVD.

Upon completion of forming the first substrate 20 and the second substrate 12, the first substrate (including the reflection film 24 and the protection film 26) 20 and the second substrate (including the wavelength selective multi-layered film 16) 12 are joined or pasted to each other. Firstly, above the wavelength selective multi-layered film 16 on the second substrate 12, a semi-solid ultraviolet hardening resin 18 is placed as shown in FIG. 9, and a side not having the protection film 26 of the first substrate 20 is pressured toward the wavelength selective multi-layered film 16 on which the ultraviolet hardening resin 18 is placed. Then, an ultraviolet ray is irradiated to the optical disk in this state so as to harden the ultraviolet hardening resin 18. As a result of the ultraviolet hardening resin 18 being hardened, the first substrate 20 and the second substrate 12 having the wavelength selective multi-layered film 16 are joined to each other. A material having a refraction closer to a refraction of polycarbonate is used for this ultraviolet hardening resin 18.

A thickness of the optical disk 10 follows a DVD standard and a CD standard, and an overall thickness of the second substrate 12, the wavelength selective multi-layered 16, and the adhesive layer 18 is 0.6 mm. An overall thickness of the second substrate 12, the wavelength selective multi-layered film 16, the adhesive layer 18, the first substrate 20, the reflection film 24, and the protection film 26 is 1.2 mm, and a tolerance is −0.06~+0.3 (DVD Book standard).

In addition, remainders of the DVD standards and CD standards are as shown in FIG. 10. A "shortest pit length" is a shortest pit length capable of being read by irradiating a laser beam thereto. A "track pit" is a distance between adjacent tracks. A "reflectivity" is a reflectivity of the laser beam being reflected on a signal recording layer. A "spot size" is a diameter of a spot on the recording layer of an irradiated laser beam. The "numerical aperture (NA)" is a value to determine a resolution of an object lens of the optical pickup 30, a focal depth, and etc. The larger the NA, the more laser beams with a high resolution and a larger amount of light, but, the shallower focal depth. A "wavelength" is a wavelength of the laser beam irradiated from a semiconductor laser. In reproducing a CD, an adjustment is performed on the optical pickup 30 on the basis of the laser beam of this length in order that the laser beam becomes 780 nm ± (plus or minus) 10 nm.

When the CD signal is reproduced from the first minute concaves/convexes 22 on the first substrate 20, a laser beam (L) having a wavelength of 780 nm ± (plus or minus) 10 nm is irradiated from a side of the second substrate 12 as shown in FIG. 1. This laser beam reaches the wavelength selective multi-layered film 16 through the second substrate 12. Then, more than 80% of the irradiated laser beam transmits the wavelength selective multi-layered film 16, and reaches the reflection film 24 through the adhesive layer 18 and the first substrate 20. The laser beam is reflected on the reflection film 24, and once again reaches the wavelength selective multi-layered film 16 through the first substrate 20 and the adhesive film 18. More than 80% of the reflected laser beam transmits the wavelength selective multi-layered film 16, and is emitted outside of the optical disk 10 through the second substrate 12. The CD signal is reproduced by gathering or picking-up the laser beam by the optical pickup 30.

When the DVD signal is reproduced from the second minute concaves/convexes 14 on the second substrate 12, a laser beam (L') having a wavelength of 650 nm ± (plus or minus) 5 nm is irradiated from a second substrate 12 side as shown in FIG. 1. This laser beam reaches the wavelength selective multi-layered film 16 through the second substrate 12. Then, more than 80% of the irradiated laser beam is reflected on the wavelength selective multi-layered film 16, and is emitted outside of the optical disk 10 once again through the second substrate 12. The DVD signal is reproduced by gathering or picking-up the laser beam by the optical pickup 30.

In the optical disk 10 of this embodiment, since the wavelength selective multi-layered film 16 transmits the laser beam having a wavelength for CD signal reproduction of 780 nm ± (plus or minus) 10 nm with a high transmissivity of more that 80%, a light amount of the laser beam reflected on the reflection film 24 increases, and thus resulting in a smaller output of the laser beam to be irradiated onto the optical disk 10 in reproducing the CD signal. In addition, the wavelength selective multi-layered film 16 reflects the laser beam having a wavelength for DVD signal reproduction of 650 nm ± (plus or minus) 5 nm by a high reflectivity of more that 80%, and therefore, an output of the laser beam to be irradiated can be reduced in reproducing the DVD signal. Therefore, it becomes possible to make an amount of electricity necessary for reproducing the optical disk 10 smaller, and also an S/N of the reproduced signal becomes large. Furthermore, the output of the laser beam may be low, so that a cost of the optical pickup 30 is reduced, and its longevity or life of the laser can be prolonged. These are advantages obtained as a result of the wavelength selective multi-layered film 16 distinctively having a wavelength selection characteristic (optical filter).

Responding to demands that come along with a diversification of a standard of the optical disk, there appears a compatible optical disk player capable of reproducing an optical disk of a plurality of standards, such as a CD and a DVD, and etc by a single player. The CD and the DVD have a signal portion formed from an inner periphery all along an outer periphery, thus possible to be reproduced by a player.

It is possible to use the optical disk 10 of this embodiment for an adjustment of the optical pickup 30 performed before shipment of such the compatible optical disk player.

According to a conventional method, firstly, it is necessary to apply a chucking to the CD and the DVD alternately each optical disk player by optical disk player when an adjustment for CD and an adjustment for DVD of the pickup 30 in the compatible optical disk player are performed by a separate CD and a DVD alternately. In addition, it is necessary to perform a task to render an eccentricity of respective disks of the CD and the DVD equal. Furthermore, it is also necessary to perform a task to render a warping (tilt) of the respective disks of the CD and the DVD equal. Therefore, this results in a great loss regarding a tact time.

On the other hand, in using the optical disk 10 of this embodiment, it is not necessary to change a disk to be chucking. In addition, the disk is identical, so that it is not necessary to painstakingly adjust an eccentricity of the disk and the tilt, thus resulting in a greatly improved tact time.

Furthermore, in using the optical disk 10, it is possible to obtain a reproduced signal with a high reflectivity, it is possible to perform an adjustment of the optical pickup 30 by using a clearer reproduced signal with a large S/N.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk, comprising:
   a first recording layer which reflects a first wavelength laser beam; and a second recording layer which is laminated on an opposite side of said first recording layer and reflects a second wavelength laser beam, wherein said second recording layer is formed by a multi-layered film having a wavelength selective characteristic so that said first wavelength laser beam is transmitted and said second wavelength laser beam is reflected, wherein said multi-layered film is a film in which $TiO_2$ layers and $SiO_2$ layers are alternately laminated.

2. An optical disk according to claim 1, wherein said multi-layered film transmits said first wavelength laser beam with a transmissivity of more than 80%, and reflects said second wavelength laser beam with a reflectivity of more than 80%.

3. An optical disk according to claim 2, wherein said first wavelength laser beam is a laser beam suitable for a CD standard, and said second wavelength laser beam is a laser beam suitable for a DVD standard.

4. A method of manufacturing an optical disk in which a second recording layer which reflects a second wavelength laser beam is laminated onto an opposite side of a first recording layer which reflects a first wavelength laser beam, comprising the following steps:

(a) forming a substrate having minute concaves/convexes on one surface;

(b) forming on said one surface said second recording layer formed of a wavelength selective multi-layered film, wherein $TiO_2$ layers and $SiO_2$ layers are alternately laminated; and (c) laminating a disk member on which said first recording layer is formed onto a surface of said second recording layer.

5. An optical disk, comprising:

a first recording layer which reflects a first wavelength laser beam; and a second recording layer which is laminated on an opposite side of said first recording layer and reflects a second wavelength laser beam, wherein said second recording layer is formed by a multi-layered film having a wavelength selective characteristic that said first wavelength laser beam is transmitted and said second wavelength laser beam is reflected, and said multi-layered film transmits said first wavelength laser beam with a transmissivity of more than 80%, and reflects said second wavelength laser beam with a reflectivity of more than 80%.

6. An optical disk according to claim 5, wherein said first wavelength laser beam is a laser beam suitable for a CD standard, and said second wavelength laser beam is a laser beam suitable for a DVD standard.

7. A method of manufacturing an optical disk in which a second recording layer which reflects a second wavelength laser beam is laminated onto an opposite side of a first recording layer which reflects a first wavelength laser beam, comprising the following steps:

(a) forming a substrate having minute concaves/convexes on one surface;

(b) forming on said one surface said second recording layer formed of a wavelength selective multi-layered film; and (c) laminating a disk member on which said first recording layer is formed onto a surface of said second recording layer, wherein said multi-layered film transmits said first wavelength laser beam with a transmissivity of more than 80%, and reflects said second wavelength laser beam with a reflectivity of more than 80%.

8. A method according to claim 7, wherein the multilayered film is formed by alternatively laminating $TiO_2$ layers and $SiO_2$ layers.

* * * * *